United States Patent
Carlson et al.

(10) Patent No.: US 7,187,398 B2
(45) Date of Patent: Mar. 6, 2007

(54) CHARACTERIZATION OF A SCAN LINE PRODUCED FROM A FACET OF A SCANNING DEVICE

(75) Inventors: Gerard J. Carlson, Boise, ID (US); B. Mark Hirst, Boise, ID (US); Mark Wibbels, Boise, ID (US)

(73) Assignee: Hewlett Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/189,174

(22) Filed: Jul. 25, 2005

(65) Prior Publication Data

US 2005/0275918 A1  Dec. 15, 2005

Related U.S. Application Data

(62) Division of application No. 09/905,279, filed on Jul. 13, 2001, now abandoned.

(51) Int. Cl.
*B41J 2/435* (2006.01)
(52) U.S. Cl. ...................................... 347/235; 347/250
(58) Field of Classification Search ................ 347/231, 347/234–235, 243, 248–250, 116, 259–261; 359/217; 368/121, 107–108, 113–114; 355/26; 250/370.08
See application file for complete search history.

(56) References Cited

U.S. PATENT DOCUMENTS

| | | | |
|---|---|---|---|
| 4,622,593 A | 11/1986 | Curry | |
| 4,950,889 A | 8/1990 | Budd et al. | |
| 4,962,981 A * | 10/1990 | Murakami et al. | 359/217 |
| 5,049,752 A * | 9/1991 | Kalaf et al. | 250/370.08 |
| 5,790,480 A * | 8/1998 | Klatser | 368/121 |
| 5,966,231 A | 10/1999 | Bush et al. | |
| 5,991,008 A | 11/1999 | Li et al. | |
| 6,351,277 B1 | 2/2002 | Skillman | |
| 6,396,561 B1 * | 5/2002 | Vernackt et al. | 355/26 |

FOREIGN PATENT DOCUMENTS

JP   62071888 A  *  4/1987

\* cited by examiner

*Primary Examiner*—Hai Pham (57) ABSTRACT

A method for refining a length of a scan line, where the scan line is produced from a facet of a scanning device. The method includes the steps of: (a) acquiring a plurality of scan line lengths produced from the facet, (b) determining from the plurality of scan line lengths, an average scan line length for the facet, and (c) determining from the average scan line length, a scan line length correction for the facet. A method for measuring a length of a scan line includes the steps of: (a) charging an electrical current integrator to a voltage while a scan line is produced from a facet, (b) measuring the voltage, and (c) determining from the voltage, the length of the scan line produced from the facet.

10 Claims, 7 Drawing Sheets

CHARACTERIZATION OF A SCAN LINE PRODUCED FROM A FACET OF A SCANNING DEVICE

CROSS REFERENCE TO RELATED APPLICATIONS

This is a divisional of application Ser. No. 09/905,279 filed Jul. 13, 2001 now abandoned.

FIELD OF THE INVENTION

The present invention relates to scanning devices and, more particularly, to a technique for characterizing a scan line that is produced from a facet of the scanning device.

BACKGROUND OF THE INVENTION

Printing devices such as laser printers, digital photocopiers and fax machines use a laser beam to write an image on a photosensitive surface. The surface moves and the laser beam scans an image by sweeping in a direction perpendicular to that of the moving surface. This scanning action is similar to the movement of an electron beam across a television tube or other cathode ray tube (CRT). However, unlike a CRT, one dimension of the image, call it the Y dimension, is controlled by the movement of the surface, while the other dimension, call it the X dimension, is controlled by the scanning action of the laser.

Laser imaging devices implement the scanning action by reflecting a laser beam off a rotating reflector, often referred to as a rotating mirror. The rotating mirror is a reflector typically having two or more faces called facets that reflect the laser beam. Mirrors with two, four, six or eight facets are not uncommon.

In a laser imaging system having a mirror with a plurality of facets, the quality of an image is affected by several factors related to the design and manufacture of the facets. An ideal system operates within the constraints listed below.

(1) In the case of an even-sided polygonal mirror, facets on opposite sides of the mirror are parallel to one another.
(2) The mirror has minimal run-out relative to its rotational center.
(3) The angles formed by the facets of the polygon are precise.
(4) The motor and bearing system run true, without wobble.

A system that fails to meet these constraints can produce objectionable artifacts in a printed image. These artifacts are due to scan lines of different lengths.

In a system using a multi-facet mirror, successive facets of the mirror produce successive scan lines of the image. Thus, a specific facet of the rotating mirror produces specific scan lines. For example, a four-faceted mirror will produce scan lines as shown in Table 1, below.

TABLE 1

| Four-Faceted Mirror | |
| --- | --- |
| Facet Number | Scan Line Number |
| 1 | 1 |
| 2 | 2 |
| 3 | 3 |
| 4 | 4 |
| 1 | 5 |

TABLE 1-continued

| Four-Faceted Mirror | |
| --- | --- |
| Facet Number | Scan Line Number |
| 2 | 6 |
| 3 | 7 |
| 4 | 8 |
| 1 | 9 |
| 2 | 10 |
| 3 | 11 |
| 4 | 12 |

Imperfections in the mirror facets can cause scan lines to be of different lengths. For example, all the scan lines written by a facet can be of one length, while those written by another facet are a different length. Presently, scanners can produce scan lines with 300 or 600 dots per inch (DPI) that vary less than one dot per line. Nonetheless, even a minor difference in the length of a scan line can cause a periodic distortion in an image.

The beginning of each scan line is electronically synchronized to a starting margin of an image. The synchronizing signal is conventionally known as a "beam detect" (BD). A variation in the scan line accumulates over the length of the scan line and typically reaches its maximum at the end of the scan line.

An observer will usually not notice any variation in a single line. However, a periodic pattern produced by the variation in the scan line may interfere with a pattern of gray scale or halftones in an image, thus creating a moiré pattern. A moiré pattern typically appears as a periodic series of lines superimposed over the image. Even though differences in the lengths of the scan lines are less than one dot wide, the human vision system is very sensitive to moiré patterns caused by errors of less than the width of one dot. For example, a human can detect a moiré pattern caused by a ¼ dot error in an image produced by a 600 DPI printer. As laser printers are called upon to print images approaching photograph quality, gray scale and halftone patterns are used more frequently, and the resulting images are more susceptible to moiré.

Methods exist that compensate for scanner imperfections by lengthening or shortening the lines produced by the facets until each line is the same length. A system applying such a method requires knowledge of:

(1) the amount of facet-to-facet imperfection, and
(2) which facet of the mirror is reflecting the laser beam.

Knowledge of the amount of facet-to-facet imperfection is used to determine how much compensation is required for a particular facet. A facet error can be characterized in terms of the time it takes to sweep a beam across a predetermined length. For example, a 600 DPI printer that prints a line across an eight-inch page prints 4800 dots.

4800 dots=600 dots/inch×8 inches

A particular model of printer may print a dot in 50 nanoseconds (ns). Thus an eight-inch line would be printed in 240 microseconds (μs).

240 μs=4800 dots×50 ns/dot

If the nominal scan line is 240 μs long, then a scanner imperfection that causes a scan line length of 240.050 μs corresponds to a length of one extra dot. A scan line length of 239.950 corresponds to a line that is one dot shorter than the nominal line. As humans can detect moiré patterns caused by a ¼ dot error, a facet-to-facet deviation of 12.5 ns can result in a noticeable imaging artifact.

Knowledge of which facet of the mirror is reflecting the laser beam is necessary so that an appropriate compensation can be applied when a particular facet is producing a scan line. The scan line lengths are corrected on a facet-by-facet basis so that all the resulting printed lines on the page are the same lengths.

One technique for characterizing a scanner involves the use of a test fixture to measure and record the scan line length of each facet. This information is either physically written onto the scanner, or stored into an electronic memory that is included with the scanner. The information is subsequently recalled during a line length correction procedure. Because the measurement is made external to the scanner system, this technique requires additional manufacturing steps for the characterization process, and further requires a step for a transfer of the characterization information from the scanner to a compensation circuit. Both steps add to the cost of the scanner.

Another technique for characterizing a scanner involves the use of a high-speed counter to accurately measure the scan line length. Dots are printed at a rate based on a dot frequency. For example, if a dot is printed in 50 ns, its effective dot frequency is 1/50 ns or 20 MHz. A counter that measures a line in a scanning system is typically clocked at least eight times faster than the dot frequency in order to provide ⅛ dot resolution. In this example, the clock frequency would be at least 160 MHz.

160 MHz=8×20 MHz

A higher clock frequency would provide an even more accurate measurement of the scanner error. For example, a 1 GHz clock would provide a timing resolution of 1 ns, which corresponds to 1/50 of a dot. Disadvantageously, the higher the clock speed at which a circuit operates, the higher is the cost of electronic circuitry and the greater is the potential for radiated noise.

An existing technique for identifying which facet of a mirror is reflecting the laser beam is to tag one facet so that the facet can be detected by a sensor. For example, the tag might be a physical mark that is optically sensed. Assume that facet #1 is tagged. The sensor will detect facet #1, and thereafter a beam detect circuit counts subsequent facets until the mirror makes a full rotation bringing facet #1 into printing position again. Disadvantageously, this technique requires a means for tagging a facet, a sensor for detecting the tag, and wiring to communicate the facet information to the compensation circuitry.

Accordingly, there is a need for a method of characterizing a scanner facet error that is performed within a scanner system without requiring high-speed electronic circuitry.

There is also a need for a method of identifying which facet is reflecting a laser beam without requiring a sensor for detecting a particular facet.

SUMMARY OF THE INVENTION

In a first embodiment of the present invention a method is provided for refining a length of a scan line, where the scan line is produced from a facet of a scanning device. The method comprises the steps of: (a) acquiring a plurality of scan line lengths produced from the facet, (b) determining from the plurality of scan line lengths, an average scan line length for the facet, and (c) determining from the average scan line length, a scan line length correction for the facet.

In a second embodiment of the present invention a method is provided for measuring a length of a scan line, where the scan line is produced from a facet of a scanning device. The method comprises the steps of: (a) charging an electrical current integrator to a voltage while a scan line is produced from a facet, (b) measuring the voltage, and (c) determining from the voltage, the length of the scan line produced from the facet.

Systems are also provided to perform each of the methods.

DETAILED DESCRIPTION OF THE PREFERRED EMBODIMENTS

Figure 1:
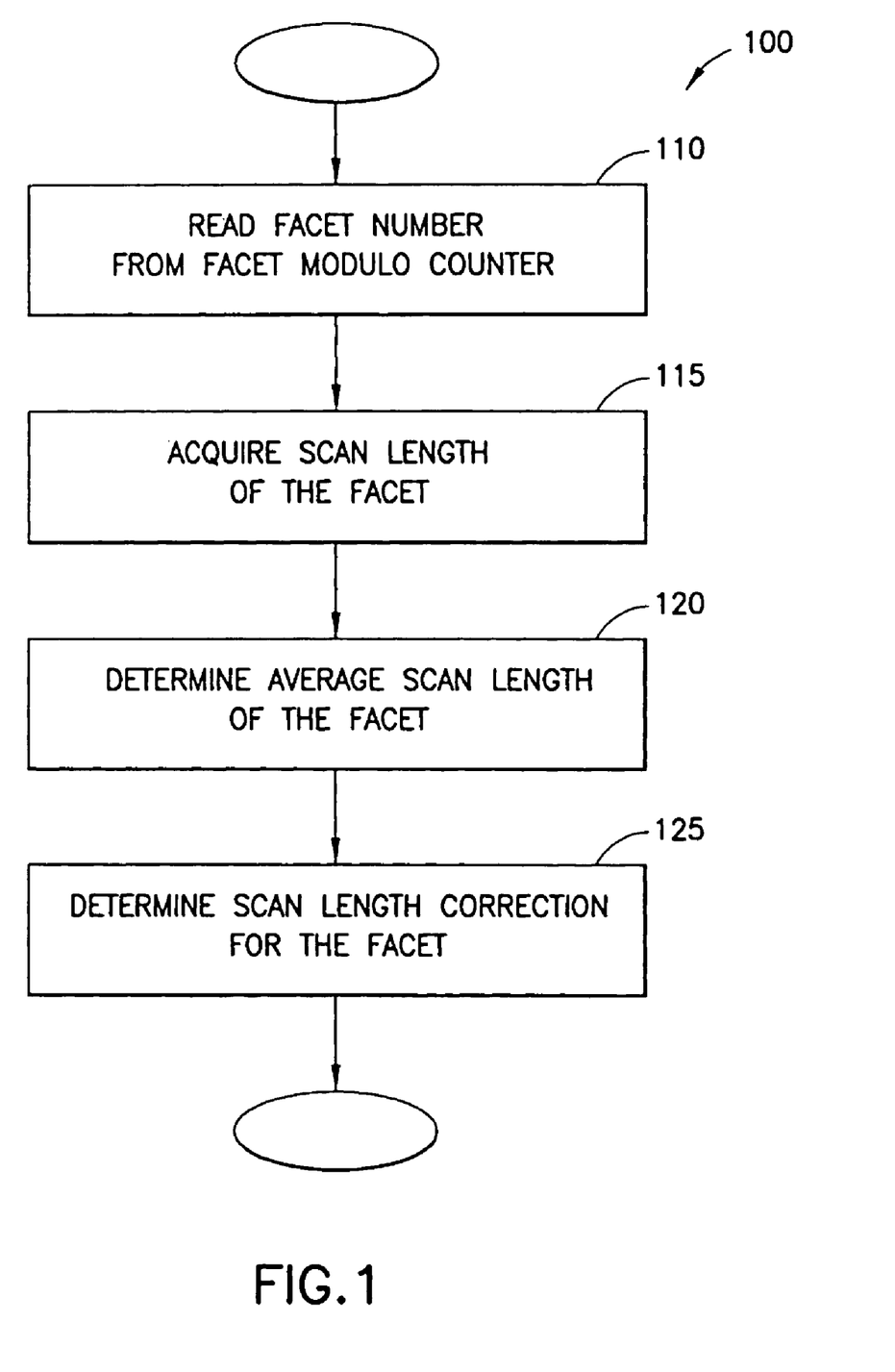
FIG. 1 is a flowchart of a method for refining a length of a scan line in accordance with the present invention.

FIG. 1 is a flowchart of a method 100 for refining a length of a scan line in accordance with the present invention. The scan line is produced from a facet of a scanning device. Typically, the facet is one of a plurality of facets on a rotating polygon mirror. As described below, method 100 includes the steps of: (a) acquiring a plurality of scan line lengths produced from a facet, (b) determining from the plurality of scan line lengths, an average length of the scan line for the facet; and (c) determining from the average scan line length, a scan line length correction for the facet. The method begins with step 110.

In step 110, the method obtains a number from a cyclic counter, such as a modulo counter. The modulo of the counter is the same as the number of facets on the mirror. The output of the counter is used to identify the facet that is producing the scan line and to associate a length of a scan line with a particular facet when determining an average scan line length as described in step 120, below. However, the counter is not intended to absolutely identify any particular facet, but instead, an arbitrary relationship is initially established between the output of the counter and each of the facets, and the relationship is maintained for the duration of the method.

For example, assume that a mirror has four facets, i.e., A, B, C and D. Accordingly, the counter will cycle through the values 0, 1, 2 and 3. At the commencement of this method, the facets and the counter will assume some arbitrary relationship, such as that shown in Table 2, below. In this example, a counter output of 2 will identify facet A.

TABLE 2

Arbitrary Relationship Between Facets and Modulo Count

| Actual Facet | Output of Counter |
|---|---|
| A | 2 |
| B | 3 |
| C | 0 |
| D | 1 |

The relationship between the facets and the counter, once established, remains fixed during the method described herein. The counter is synchronized to advance as the mirror rotates to each subsequent facet. In a preferred implementation, the synchronization can be provided by a reference signal such as a beam detect, as mentioned earlier. The method then advances to step 115.

In step 115, the method acquires a length of a scan line produced by the facet. As the mirror rotates, the method acquires a plurality of scan line lengths produced from the facet. At this step, any conventional technique for measuring a scan line length can be employed, however, in the preferred embodiment, the scan line length is acquired from a counter that is clocked at a rate of less than 8 times the dot imaging frequency. The method then advances to step 120.

In step 120, the method determines from the plurality of scan line lengths acquired in step 115, an average scan line length for the facets. The method then advances to step 125.

In step 125, the method determines from the average scan line length determined in step 120, a scan line length correction for the facet. That is, the method determines a compensation that will be applied to either lengthen or shorten the scan line produced by the facet.

In the preferred embodiment, when applying the compensation to a scan line, the modulo counter used to identify a facet in step 110, is also used to identify the facet during correction of the scan line. That is, the output of the modulo counter is used to identify a particular facet and an appropriate compensation is applied when that facet is producing a scan line.

The method illustrated in FIG. 1 is executed for each of the facets on the mirror. The method can be executed in a single pass in which data is collected for all of the facets, and the respective average scan lengths are then determined, or the method can be executed as a loop.

The correction for a scan line is achieved by shifting the time at which a pixel is printed, thus resulting in a shift of the point at which the pixel is printed so that adjacent raster lines are aligned with one another. For example, a pixel at row 5, column 4000 will properly align with a pixel at row 6, column 4000.

Figure 6:
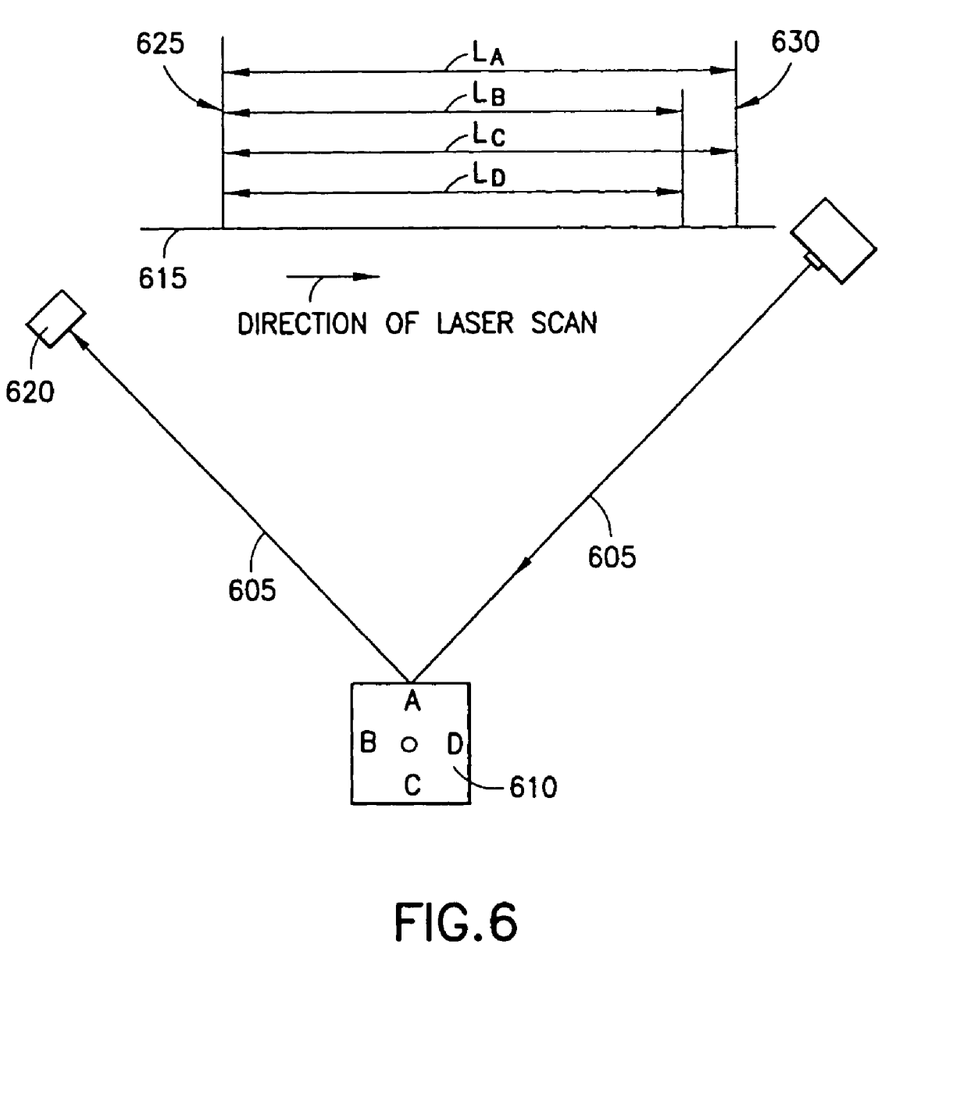
FIG. 6 is a block diagram of a simplified laser scanning system.
Figure 7:
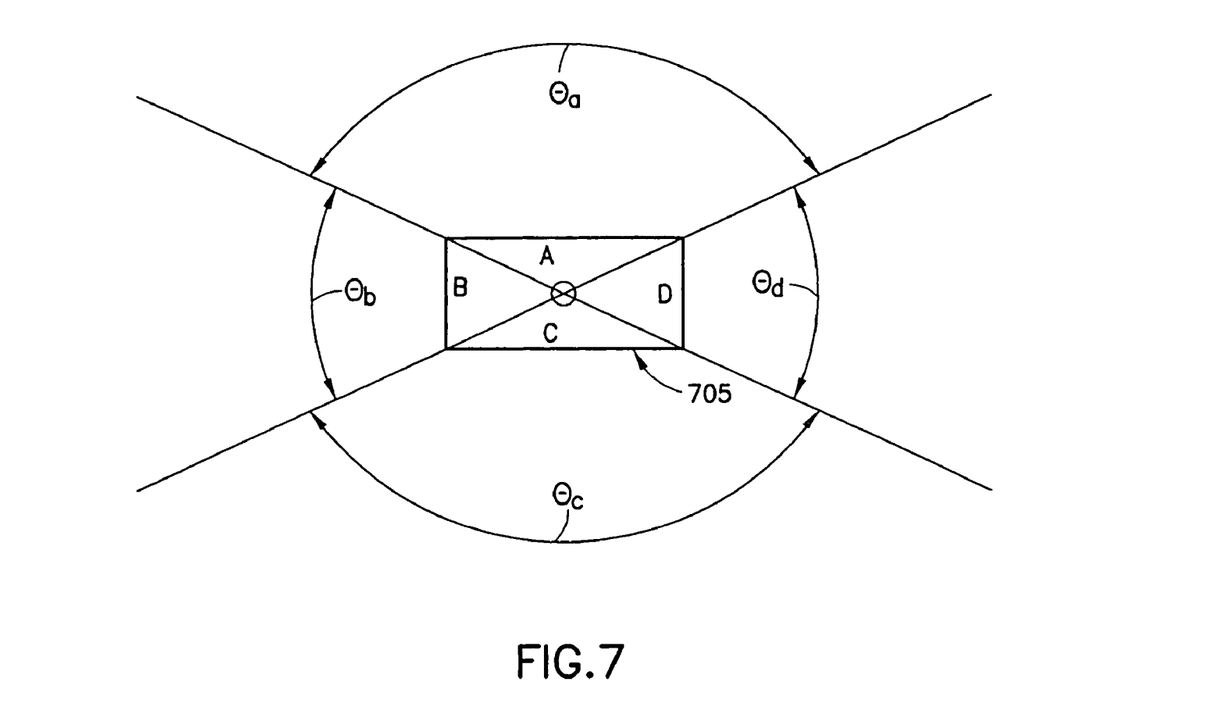
FIG. 7 is a diagram of an imperfect four-sided reflector.

FIGS. 6 and 7, in association with their related descriptions, present a technique for determining a compensation value. However, the present invention is not limited to the use of any particular technique of line length compensation, but instead, any suitable compensation technique can be employed.

FIG. 6 shows a simplified laser scanner system. A laser beam 605 reflects off of a rotating mirror 610 and impinges on a surface of a photoconductor 615. Rotating mirror 610, shown here as rotating in a clockwise direction, causes laser beam 605 to sweep across the surface of photoconductor 615 in a left to right direction.

Prior to impinging on photoconductor 615, the reflected laser beam 605 activates a beam detect sensor 620 located to the left of a left margin 625. When laser beam 605 crosses left margin 625, a laser control system (not shown) begins to modulate laser beam 605 with print image data to print a line. The modulation continues until laser beam 605 reaches a right margin 630.

Rotating mirror 610 has four surfaces, namely A, B, C, and D. Due to slight irregularities in the surfaces of A, B, C and D, the printed lines will have different lengths. The four different line lengths La, Lb, Lc, and Ld correspond to the mirror face from which they were produced. In practice, correcting lenses (not shown) are placed between rotating mirror 610 and photoconductor 615.

FIG. 7 shows a four-sided mirror 705, which is imperfect because its four sides are not of equal length. In this figure, the imperfections are grossly exaggerated for the sake of clarity. Because the lengths are not equal, the angles $\Theta a$, $\Theta b$, $\Theta c$, and $\Theta d$, traced out by the faces A, B, C, and D are different from one another.

Mirror 705 rotates at a constant angular velocity, $\omega$. The amount of time that each face spends reflecting the laser beam is equal to its corresponding angle $\Theta a$, $\Theta b$, $\Theta c$, or $\Theta d$, divided by $\omega$.

Table 3 shows the time that each facet spends reflecting the laser beam.

TABLE 3

| Facet | Angular velocity | Facet Angle | Time per facet |
|---|---|---|---|
| A | $\omega$ | $\Theta^a$ | $\Theta^a/\omega$ = Ta |
| B | $\omega$ | $\Theta^b$ | $\Theta^b/\omega$ = Tb |
| C | $\omega$ | $\Theta^c$ | $\Theta^c/\omega$ = Tc |
| D | $\omega$ | $\Theta^d$ | $\Theta^d/\omega$ = Td |

A wide facet, such as facet A in FIG. 7, sweeps through a large angle $\Theta a$, and thus reflects the laser beam for a long period of time $\Theta a/\omega$=Ta. In contrast a narrow facet, such as Facet B, sweeps through a smaller angle $\Theta b$, and reflects the laser beam for a shorter period of time $\Theta b/\omega$=Tb. As a result, the time between the beam detect pulse when facet A first rotates into the laser, and the second beam detect when facet B rotates into the laser will be longer than the time between beam detects for facets B and C.

The present invention, by accurately measuring these beam detect periods, can determine which facets are wider or narrower. A compensation method can then adjust the laser dot frequency to compensate for the facet variation. An exemplary compensation method is described below.

A fraction of the time that a facet is reflecting the laser beam is used for writing printable data between the left and right margins. Call this fraction c. A given facet such as facet A, will write data for cTa, while facet B will write for cTb. For a writeable area between margins L, the laser beam writing velocity in this writeable area is:

$$Sx=L/(cTx)$$

where x refers to the facet A, B, C or D. Sx has the units of distance per time such as inches per second.

A dot density D, is measured in dots per unit distance, for example, 600 dots per inch. Multiplying D by Sx yields units of dots per time.

Typical laser control circuitry uses one cycle of a digital clock to write a single dot. The digital clock, also called a video clock, can then be calculated from the following formula:

$$F=D*L/(c*Tx)$$

As D, c and L are design constants of the scanning device, the beam detect period, Tx, measured by the invention, can be used to calculate a frequency Fx, needed for line length compensation. x refers to the facet A, B, C or D Stated qualitatively, a wider facet will write the writeable area for a longer period of time, and the writing rate or frequency of the laser must be slower. Conversely, a narrower facet will sweep the laser beam quickly through the writeable area and the laser must write more quickly using a higher frequency.

The following example demonstrates a compensation method.

Given:
L=8.000 inches
D=600 dots/inch
c=0.5
Ta=502 ($10^{-6}$) seconds measured by the invention.
Tb=499 ($10^{-6}$) seconds measured by the invention.
Tc=502 ($10^{-6}$) seconds measured by the invention.
Td=499 ($10^{-6}$) seconds measured by the invention.

The video frequency required for each facet is:
Fa=600*8/(0.5*502($10^{-6}$))=19.123506 MHz
Fb=600*8/(0.5*499($10^{-6}$))=19.238477 MHz
Fc=600*8/(0.5*502($10^{-6}$))=19.123506 MHz
Fd=600*8/(0.5*499($10^{-6}$))=19.238477 MHz Any convenient frequency synthesis technique can be used to control the video frequency on a facet by facet basis.

Figure 2:
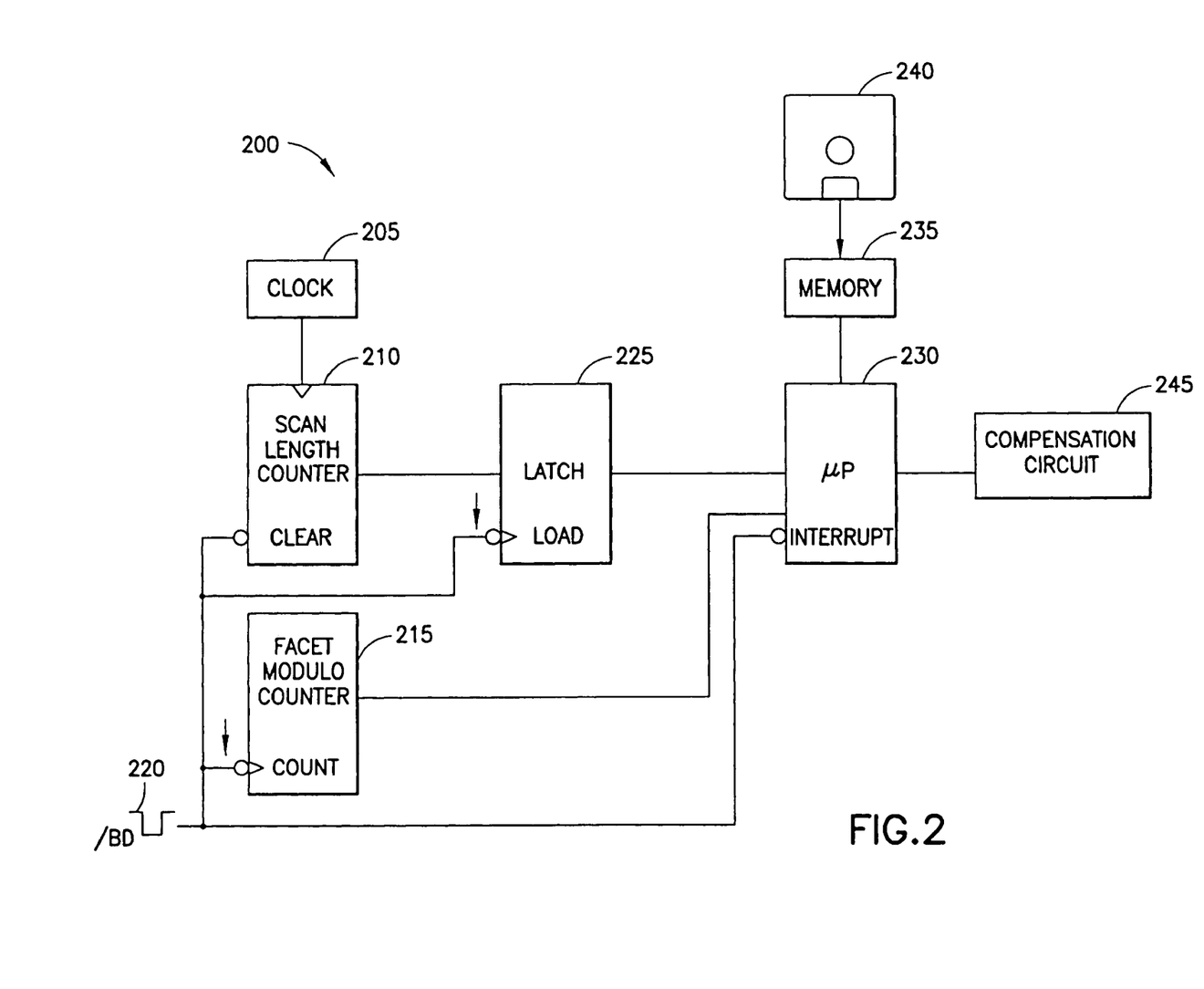
FIG. 2 is a schematic diagram of a system for refining a length of a scan line in accordance with the present invention.

FIG. 2 is a schematic diagram of a system 200 for refining a length of a scan line in accordance with the present invention. The scan line is produced from a facet of a scanning device. Typically, the facet is one of a plurality of facets on a rotating polygon mirror. As described below, system 200 includes components for (a) acquiring a plurality of scan line lengths produced from a facet, (b) determining from the plurality of scan line lengths, an average scan line length for the facet, and (c) determining from the average scan line length, a scan line length correction for the facet.

System 200 includes a clock 205, a scan length counter 210, a facet modulo counter 215, a latch 225, a microprocessor 230, memory 235 and a scan line length compensation circuit 245.

System 200 receives a reference signal that indicates a particular point in a scan line produced from a facet. In the embodiment shown in FIG. 2, the reference signal is a beam detect (BD) 220, which indicates the start of a scan line. Beam detect 220 is routed to scan length counter 210, facet modulo counter 215, latch 225 and microprocessor 230.

Clock 205 is a clock circuit. It provides a clock to scan length counter 210.

Scan length counter 210 has a CLOCK input driven by clock 205, and a CLEAR input driven by beam detect 220. It acquires and measures a length of a scan line produced from a facet. Scan length counter 210 is cleared by beam detect 220, and thereafter counts up to indicate the length of the scan line. In the preferred embodiment, it is clocked at a rate of less than 8 times the dot imaging frequency of the scanner, but it can operate at a higher frequency. Because system 200 determines an average of a plurality of scan line lengths from a facet, system 200 can resolve a scan line error to a fraction of a pixel notwithstanding the use of a relatively slow clock frequency from clock 205. The output of scan length counter 210 is routed to latch 225.

Latch 225 receives a scan length count from scan length counter 210, and it has a LOAD input driven by beam detect 220. Beam detect 220 causes latch 225 to latch the scan length count from scan length counter 210. The latched scan length count is routed to microprocessor 230.

Facet modulo counter 215 has a COUNT input driven by beam detect 220. It is a cyclic counter for providing a number for the facet to identify the facet and to associate the scan line length with the facet when determining the average scan line length. Its modulo is the same as the number of facets on the mirror. Facet modulo counter 215 is incremented upon each occurrence of beam detect 220. The counter is not intended to absolutely identify any particular facet, but instead, it establishes an arbitrary count that is subsequently used to identify each of the facets. The output of facet modulo counter is routed to microprocessor 230.

Microprocessor 230 receives scan length count data from latch 225, and the facet number from facet modulo counter 215. It also has an INTERRUPT input that is driven by beam detect 220. Microprocessor 230 operates in association with memory 235, which stores data and instructions for execution by microprocessor 230. Upon the occurrence of beam detect 220, microprocessor 230 is interrupted. It loads scan length count data from latch 225, and the facet number from facet modulo counter 215. Thereafter it determines an average of a plurality of scan line lengths for the facet. The average scan line length for the facet is routed from microprocessor 230 to compensation circuit 245.

Compensation circuit 245 receives the average scan line length from microprocessor 230. It uses the average scan line length to determine a scan line length correction for the facet.

System 200 performs the operations described above for each of the facets of the mirror. The scan line length data for each of the facets is acquired by scan length counter 210 and latch 225, and then stored into memory 235 for subsequent use by microprocessor 230.

In the preferred embodiment, when applying the compensation to a scan line facet modulo counter 215 is also used to identify the facet during correction of the scan line. That is, the output of facet modulo counter 215 is used to identify a particular facet and an appropriate compensation is applied when that facet is producing a scan line.

System 200 can be implemented with discrete components, firmware, or a single processor such as a digital signal processor. It can also be implemented in software and executed on a general-purpose computer. Furthermore, while the procedures required to execute the invention hereof are indicated as already loaded into a memory, such as memory 235, they may be configured on a storage medium, such as data memory 240, for subsequent loading into memory 235.

Figure 3:
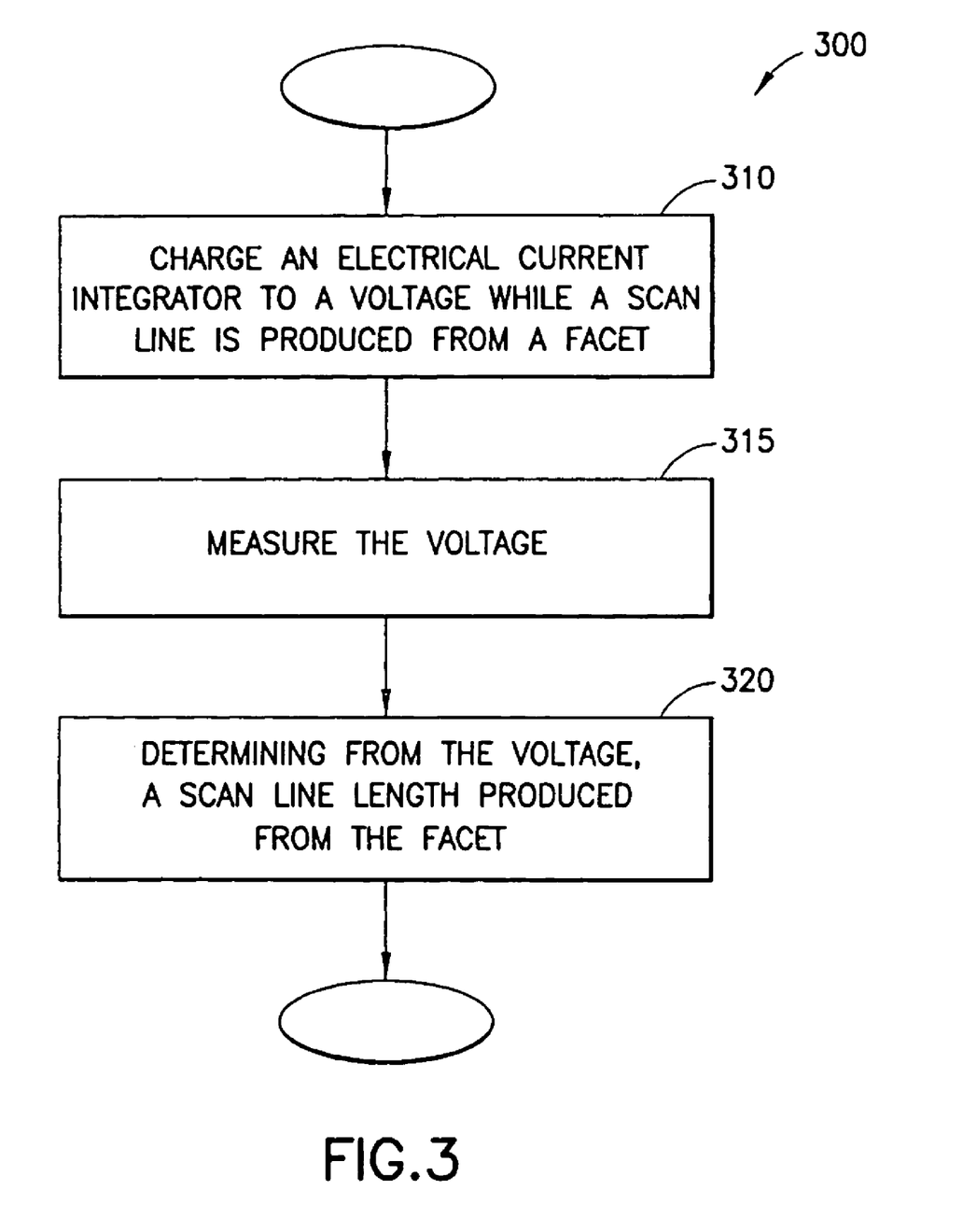
FIG. 3 is a flowchart of a method for measuring a length of a scan line in accordance with the present invention.

FIG. 3 is a flowchart of a method 300 for measuring a length of a scan line, where the scan line is produced from a facet of a scanning device. Typically, the facet is one of a plurality of facets on a rotating polygon mirror. As described below, method 300 includes the steps of: (a) charging an electrical current integrator to a voltage while a scan line is produced from a facet, (b) measuring the voltage, and (c) determining from the voltage, a length of a scan line produced from the facet. The method begins with step 310.

In step 310, the method performs the step of charging an electrical current integrator to a voltage while a scan line is produced from a facet. A current integrator charges to a voltage as a function of time.

$$v(t)=1/C \int i(t)dt$$

Where: v(t)=voltage at time (t)
C=capacitance of integrator
i(t)=current at time (t)

Accordingly, the voltage (v) to which the integrator charges is a function of the time (t), i.e. an integration interval, during which the scan line is produced. As described below, the scan line length can be determined from the voltage (v). The method then advances to step 315.

In step 315, the method performs the step of measuring the voltage (v) to which the integrator charged. The method then advances to step 320.

In step 320, the method performs the step of determining from the voltage, a length of a scan line produced from the facet. That is, it determines the time (t) required for the integrator to charge to the voltage (v), and relates the time (t) to the scan line length. The scan line length can thereafter be used to determine a scan line length correction for the facet.

Preferably, prior to step 310, the method performs the step of resetting the electrical current integrator in response to a receipt of a reference signal, such as a beam detect, that indicates a start of the scan line produced from the facet. The beginning of the period of integration then coincides with the beginning of the scan line.

Method 300 can achieve better resolution by delaying the resetting step for a predetermined interval of time from the receipt of the reference signal. For example, if the integration interval is centered around an expected time of occurrence of a second beam detect signal, then the integration interval will be shorter. If the voltage (v) in step 320 is measured using an A/D, as described below in association with FIG. 4, then by delaying the integration interval, an A/D of fewer bits can be used and a greater resolution per bit is also provided. That is, the smaller the integration interval, e.g., 256 ns rather than 250 s, then the fewer the number of bits required of the A/D, and the greater the resolution per bit. The relationship between the reference signal and the resetting step are described in greater detail in association with FIG. 5, below.

Since the voltage (v) measured during step 315 is a function of the time at which the measurement is taken, consideration must be given to the timing of the measurement. The method can sample the voltage (v) in response to a signal that indicates an end of the scan line produced by the facet, or in response to a receipt of a signal that indicates a start of a scan line produced by a next facet. In either case, the signal provides a convenient point of reference that is related to the timing of the production of a scan line.

In practice, method 300 is executed for each of a plurality of facets on the mirror. In such a case, method 300 performs the additional step of obtaining a number from a cyclic counter to identify the facet and to associate the scan line length with the facet when determining the scan line length.

Figure 4:
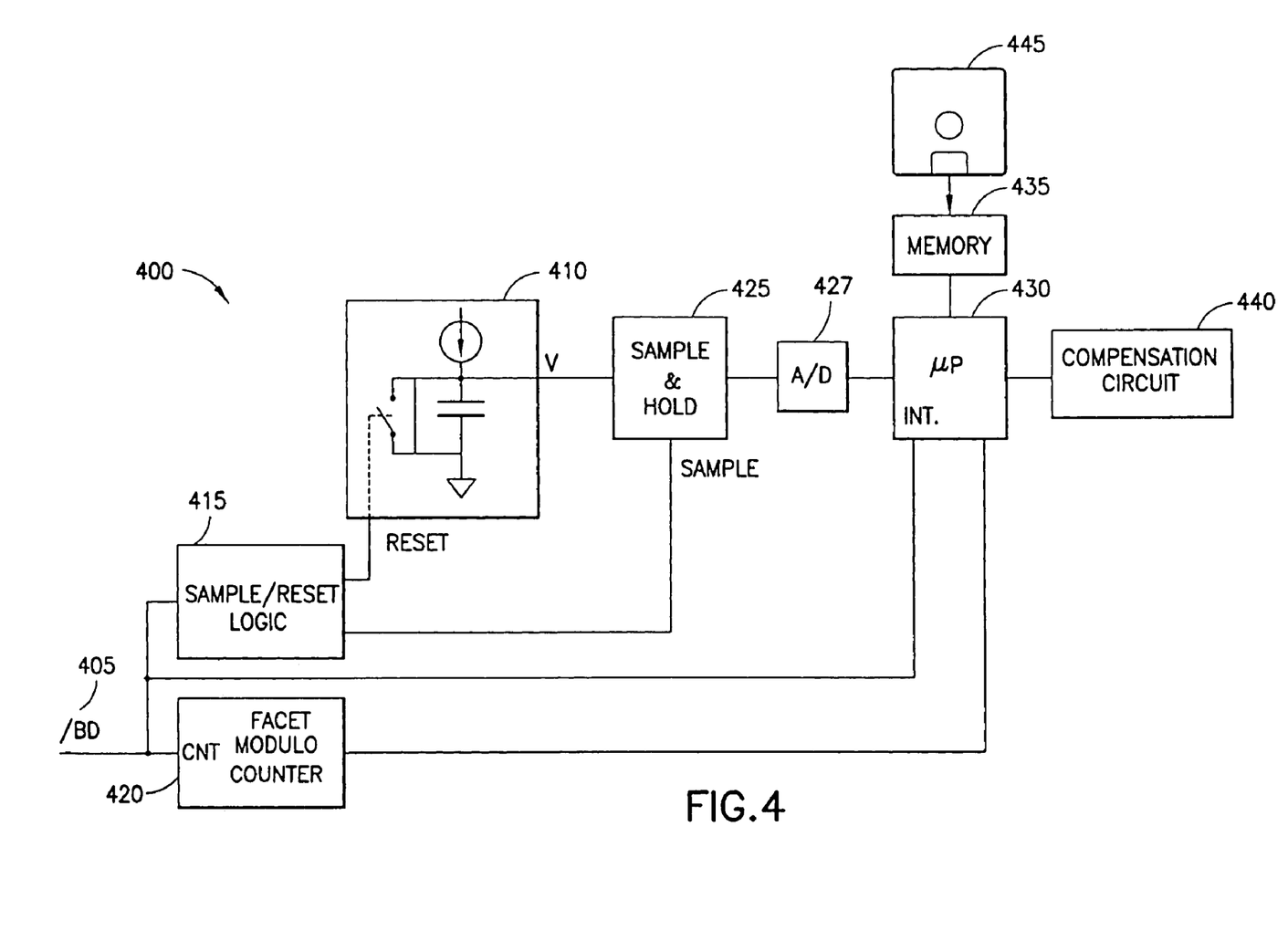
FIG. 4 is a schematic diagram of a system for measuring a length of a scan line in accordance with the present invention.

FIG. 4 is a schematic diagram of a system 400 for measuring a length of a scan line in accordance with the present invention. The scan line is produced from a facet of a scanning device, and typically, the facet is one of a plurality of facets on a rotating polygon mirror. As described below, system 400 includes components for: (a) charging an electrical current integrator to a voltage while a scan line is produced from a facet, (b) measuring the voltage, and (c) determining from the voltage, a length of a scan line for the facet.

System 400 includes an electrical current integrator 410, a sample/reset logic circuit 415, a facet modulo counter 420, a sample and hold circuit 425, an analog to digital converter (A/D) 427, a microprocessor 430, a memory 435 and a compensation circuit 440.

System 400 receives a reference signal that indicates a particular point in a scan line produced from a facet. In the embodiment shown in FIG. 4, the reference signal is a beam detect (BD) 405, which indicates the start of a scan line. Beam detect 405 is routed to sample/reset logic circuit 415, microprocessor 430 and facet modulo counter 420.

Integrator 410 has a RESET input that is driven by a reset control signal from sample/reset logic circuit 415. After being reset, it charges to a voltage (v) while a scan line is produced from a facet. The length of a scan line can be determined from the voltage (v). The voltage (v) out of integrator 410 is routed to sample and hold circuit 425.

Sample/reset logic circuit 415 has an input to receive beam detect 405, and it provides a reset control signal to integrator 410 and a sample control signal to sample and hold 425. Sample/reset logic circuit 415 issues the reset control signal to integrator 410 a predetermined interval of time after receiving beam detect 405. It issues the sample control signal to sample and hold circuit 425 at a time that indicates a convenient point in the production of a scan line. For example, the sample control signal can be triggered by beam detect 405, which may indicate either the end of the scan line that was produced from the facet or a start of a scan line produced by the next facet on the mirror. The timing relationships between beam detect 405, the reset control signal and the sample control signal are described below in association with FIG. 5.

Facet modulo counter 420 has a COUNT input driven by beam detect 405. It is a cyclic counter for providing a number for the facet to identify the facet and to associate the scan line length with the facet when determining the scan line length. Its modulo is the same as the number of facets on the mirror. Facet modulo counter 420 is incremented upon each occurrence of beam detect 405. The counter is not intended to absolutely identify any particular facet, but instead, it establishes an arbitrary count that is subsequently used to identify each of the facets. The output of facet modulo counter 420 is routed to microprocessor 430.

Sample and hold circuit 425 has an input to receive voltage (v) from integrator 410, and an input for the sample control signal from sample/reset logic circuit 415. Sample and hold circuit 425 samples and holds voltage (v), and provides it as an input to A/D 427.

A/D 427 receives voltage (v), which is an analog signal, from sample and hold circuit 425. It performs an A/D conversion of voltage (v) and provides a digitized voltage as an input to microprocessor 430.

Microprocessor 430 has data inputs to receive the digitized voltage from A/D 427, and the count from facet modulo counter 420. It also has an INTERRUPT input that is driven by beam detect 405. Microprocessor 430 operates in association with memory 435, which stores data and instructions for execution by microprocessor 430. Upon the occurrence of beam detect 405, microprocessor 430 is interrupted. It reads the digitized voltage data from A/D 427, and the facet number from facet modulo counter 420. Thereafter, it determines the scan line length of the facet. The scan line length is routed from an output of microprocessor 430 to an input of compensation circuit 440.

Compensation circuit 440 has an input to receive the scan line length data from microprocessor 430. From the scan line length data, it determines a scan line length correction for the facet.

In the preferred embodiment, when applying the compensation to a scan line facet modulo counter 420 is also used to identify the facet during correction of the scan line. That is, the output of facet modulo counter 420 is used to identify a particular facet and an appropriate compensation is applied when that facet is producing a scan line.

System 400 performs the operations described above for each of the facets of the mirror. The scan line length data for each of the facets is measured for each of the facets and then stored into memory 435 for subsequent use by microprocessor 430.

System 400 can be implemented with discrete components. It can also be implemented so that the functions of some components, for example sample/reset logic circuit 415, facet modulo counter 420, A/D 427, microprocessor 430, memory 435 and compensation circuit 440 are performed by firmware, or a single processor such as a digital signal processor. These functions can also be implemented in software and executed on a general-purpose computer. Furthermore, while the procedures required to execute the invention hereof are indicated as already loaded into a memory such as memory 435, they may be configured on a storage medium, such as data memory 445, for subsequent loading into memory 435.

Figure 5:
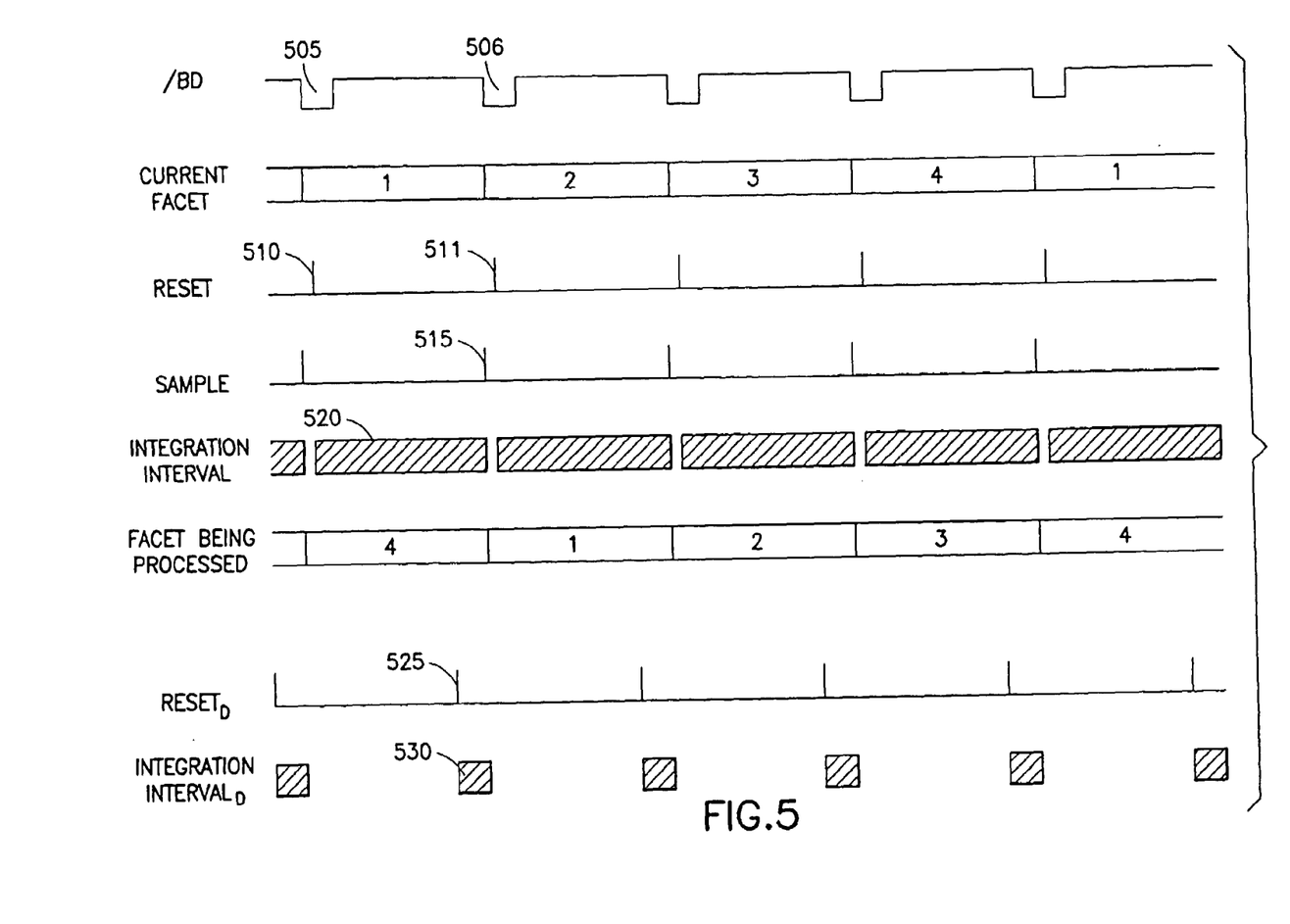
FIG. 5 is a timing diagram showing how delaying the resetting of an integrator effects the integration interval of the integrator.

FIG. 5 is a timing diagram showing how delaying the resetting of an integrator effects the integration interval of the integrator. Assume that an active-low beam detect (/BD) occurs at the beginning of a scan line from a facet of a rotating mirror that has four facets as shown by the progression of the Current Facet. The integrator is reset at the time of a Reset pulse and sampled at the time of a Sample pulse.

Two timing examples are presented below. In these examples, a beam detect pulse 505 indicates the start of a scan line from Facet 1, and a beam detect pulse 506 indicates the start of a scan line from Facet 2.

In the first example, a Reset pulse 510 occurs shortly after the leading edge of beam detect pulse 505, a Sample pulse 515 occurs shortly after the leading edge of beam detect pulse 506, and shortly thereafter, a Reset pulse 511 resets the integrator voltage to 0 volts in preparation of acquiring a subsequent sample. The integrator charges to a voltage during an Integration Interval 520 that spans the period of time from Reset pulse 510 to Sample pulse 515. The length of Integration Interval 520 can be determined from the voltage, and in turn, the scan line length of Facet 1 can be determined from the length of Integration Interval 520.

In a second example, a delayed Reset (Reset$_D$) pulse 525 occurs a predetermined time after beam detect pulse 505. As in the first example, Sample pulse 515 occurs shortly after the leading edge of beam detect pulse 506. The integrator charges to a voltage during a delayed Integration Interval (Integration Interval$_D$) 530 that spans the period of time from Reset$_D$ pulse 525 to Sample pulse 515. The length of Integration Interval$_D$ 530 can be determined from the voltage, and in turn, the scan line length of Facet 1 can be determined from the sum of the predetermined period of delay and the length of Integration Interval$_D$ 530.

The voltage output of an integrator is a function of the duration of an integration interval. Integration Interval 520 is longer than Integration Interval$_D$ 530. Accordingly, the voltage sampled at the end of Integration Interval 520 will be greater than the voltage sampled at the end of Integration Interval$_D$ 530. If Integration Interval 520 was 240 us, then a 16-bit D/A is required in order to obtain a resolution of 3.67 ns.

$$3.67 \text{ ns} = 240 \text{ s}/2^{16}$$

However, if Reset$_D$ pulse 525 occurs after a delay of 239 us, then Integration Interval$_D$ 530 is 1 us and a less expensive A/D of 10 bits can resolve the interval down to 1 ns.

$$1 \text{ ns} = 1 \text{ us}/2^{10}$$

That is, the use of a delay in this case allows a use of a less expensive A/D.

The resolution of a measurement of a scan line length can be further improved as described above in association with FIGS. 3 and 4. By delaying the resetting of the integrator, the integration interval will be shortened, an A/D of fewer bits can be used and a greater resolution per bit is also provided.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for refining a length of a scan line produced from one of a plurality of facets on a rotating reflector in a scanning device, the method comprising:
   identifying said facet with a number from a cyclic counter;
   charging an electrical current integrator to a voltage while a scan line is produced from said facet;
   measuring said voltage;
   determining from said voltage a length of said scan line;
   repeating the acts of charging, measuring and determining at least once;
   determining an average scan line length for said facet from said scan line lengths;
   determining a scan line length correction for said facet from said average scan line length; and then
   applying said correction for said facet identified by said facet number when said facet is producing a scan line.

2. The method of claim 1, further comprising before said charging, resetting said electrical current integrator in response to receipt of a reference signal that indicates a start of said scan line produced from said facet.

3. The method of claim 2, wherein said resetting is delayed by a predetermined interval of time from said receipt of said reference signal.

4. The method of claim 1, wherein said measuring samples said voltage in response to receipt of a reference signal that indicates an end of said scan line produced from said facet.

5. The method of claim 1, wherein said measuring samples said voltage in response to a receipt of a reference signal that indicates a start of a scan line produced by a next facet.

6. A storage medium that includes instructions for controlling a processor to execute a method for refining a length of a scan line produced from one of a plurality of facets on a rotating reflector in a scanning device, the method comprising:
   identifying said facet with a number from a cyclic counter;
   charging an electrical current integrator to a voltage while a scan line is produced from said facet;
   measuring said voltage;
   determining from said voltage a length of said scan line;
   repeating the acts of charging, measuring and determining at least once;
   determining an average scan line length for said facet from said scan line lengths;
   determining a scan line length correction for said facet from said average scan line length; and then applying said correction for said facet identified by said facet number when said facet is producing a scan line.

7. The medium of claim 6, wherein the method further comprises before said charging, resetting said electrical current integrator in response to receipt of a reference signal that indicates a start of said scan line produced from said facet.

8. The medium of claim 7, wherein said resetting is delayed by a predetermined interval of time from said receipt of said reference signal.

9. The method of claim 6, wherein said measuring samples said voltage in response to receipt of a reference signal that indicates an end of said scan line produced from said facet.

10. The method of claim 6, wherein said measuring samples said voltage in response to a receipt of a reference signal that indicates a start of a scan line produced by a next facet.

* * * * *